US012657237B2

(12) United States Patent
de Juan et al.

(10) Patent No.: US 12,657,237 B2
(45) Date of Patent: Jun. 16, 2026

(54) SYSTEMS AND METHODS FOR GENERATING A QUERYABLE IMAGE FROM TEXT

(71) Applicant: YAHOO ASSETS LLC, New York, NY (US)

(72) Inventors: Paloma de Juan, New York, NY (US); Joao Vitor Baldini Soares, New York, NY (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 18/491,037

(22) Filed: Oct. 20, 2023

(65) Prior Publication Data

US 2025/0131034 A1    Apr. 24, 2025

(51) Int. Cl.
| | |
|---|---|
| *G06F 16/532* | (2019.01) |
| *G06F 16/538* | (2019.01) |
| *G06F 40/40* | (2020.01) |
| *G06T 11/00* | (2006.01) |

(52) U.S. Cl.
CPC .......... *G06F 16/532* (2019.01); *G06F 16/538* (2019.01); *G06F 40/40* (2020.01); *G06T 11/00* (2013.01); *G06T 2200/24* (2013.01)

(58) Field of Classification Search
CPC ...... G06F 16/532; G06F 16/538; G06F 40/40; G06T 11/00; G06T 2200/24
See application file for complete search history.

(56) References Cited

U.S. PATENT DOCUMENTS

| | | | | |
|---|---|---|---|---|
| 11,941,678 | B1 * | 3/2024 | Sadr ................... | G06Q 30/0627 |
| 2017/0372204 | A1 * | 12/2017 | Sweeney ................. | G06N 5/02 |
| 2019/0065460 | A1 * | 2/2019 | Xin ........................ | G06N 3/044 |
| 2019/0392066 | A1 * | 12/2019 | Kim ................. | G06F 16/24578 |
| 2021/0042374 | A1 * | 2/2021 | Davis ................ | G06F 16/24578 |

* cited by examiner

*Primary Examiner* — Jensen Hu

(74) *Attorney, Agent, or Firm* — James J. DeCarlo; Greenberg Traurig, LLP

(57) ABSTRACT

In some implementations, the techniques described herein relate to a method including (i) receiving, by a processor, user input describing at least one parameter for a query image, (ii) generating, via a generative machine learning model executed by the processor, the query image based at least in part on the user input describing the at least one parameter for the query image, (iii) providing, by the processor, the query image as input to an image-based search algorithm, and (iv) returning a result received by the processor from the image-based search algorithm.

20 Claims, 5 Drawing Sheets

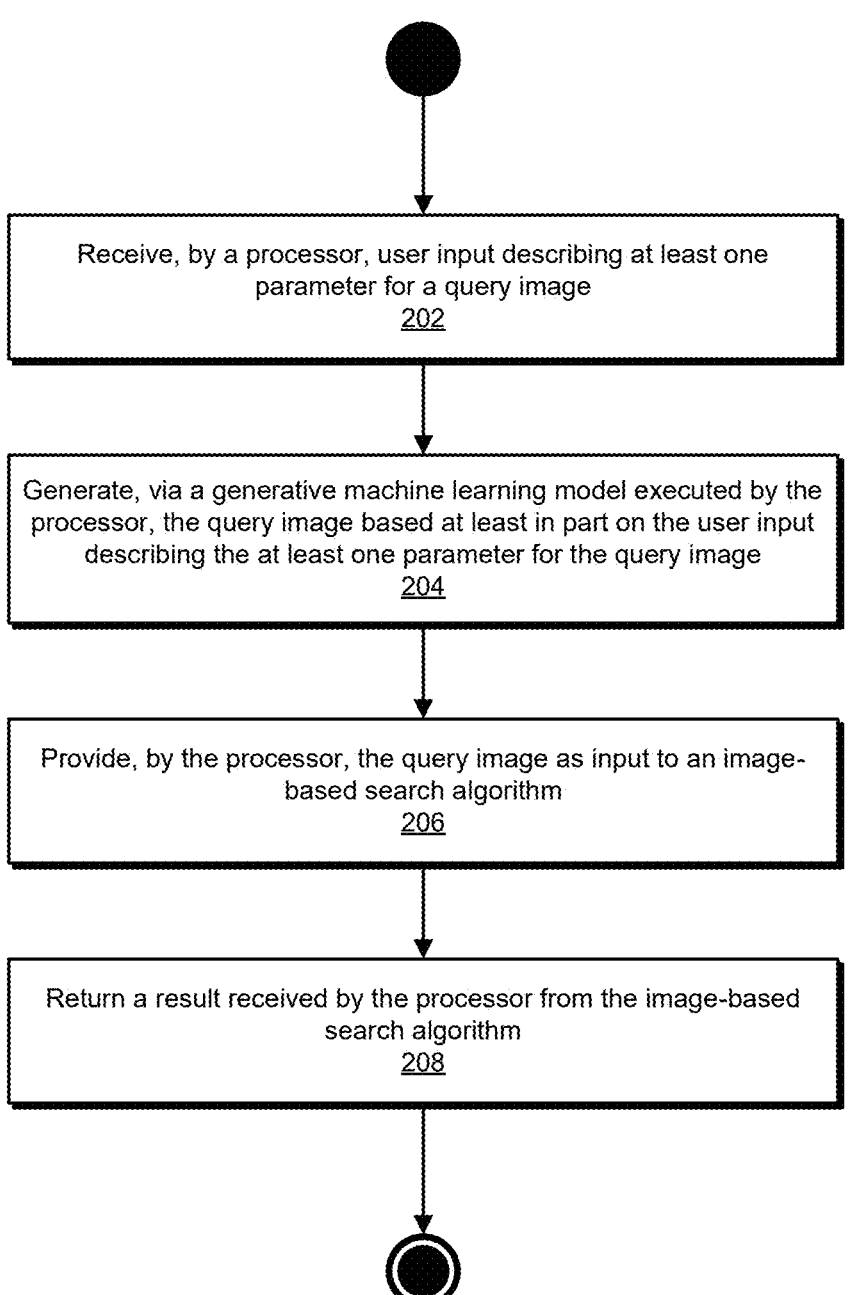

Receive, by a processor, user input describing at least one
parameter for a query image
202

Generate, via a generative machine learning model executed by the
processor, the query image based at least in part on the user input
describing the at least one parameter for the query image
204

Provide, by the processor, the query image as input to an image-
based search algorithm
206

Return a result received by the processor from the image-based
search algorithm
208

*FIG. 2*

SYSTEMS AND METHODS FOR GENERATING A QUERYABLE IMAGE FROM TEXT

BACKGROUND

Many search engines exist that enable a user to search for images based on text. However, when searching for a particular image, it can sometimes be more effective or practical to search using an image as the query rather than using text. Image-based search algorithms can compare images to one another and return similar images, improving the accuracy and effectiveness of results for users who are looking for particular images. Unfortunately, a user may not have an existing image that matches what they are looking for and may lack the skills or tools to create the specific image they need to serve as a query image to an image-based search algorithm. This may make it difficult for a user to use an image-based search algorithm.

BRIEF DESCRIPTION OF THE DRAWINGS

FIG. 2 is a flow diagram illustrating a method for a queryable image from text according to some of the example embodiments.

DETAILED DESCRIPTION

Figure 1:
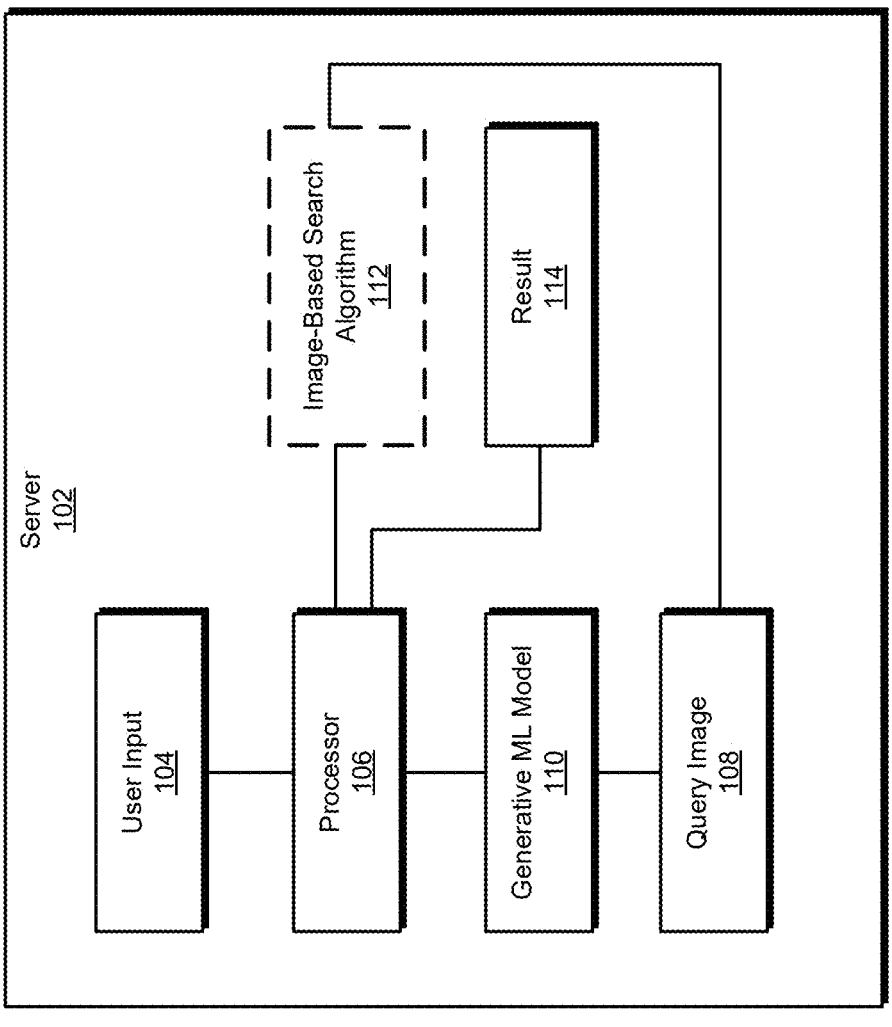
FIG. 1 is a block diagram illustrating a system for generating a queryable image from text according to some of the example embodiments.

The instant disclosure describes systems and methods for generating a queryable image from text. Various machine learning (ML) models are capable of generating images. One example of such a model is a generative ML model. Generative ML models, often underpinned by Generative Adversarial Networks (GANs) or diffusion models as well as text-based transformer models, are trained on massive datasets of images and text prompts and can be used to generate images of various sizes and styles in response to text and/or image-based prompts. Generative ML models are typically composed of a neural network with many parameters (typically billions of weights or more). For example, a generative ML model may use a GAN to analyze training data and/or image inputs. In some implementations, a generative ML model may use multiple neural networks working in conjunction.

The example embodiments herein describe methods, computer-readable media, device, and systems that transform text-based user input into an image via a generative ML model and provide that image as input to an image-based search algorithm. In some implementations, the systems described herein may enable a user to create a doodle and provide that doodle, in lieu of or in addition to text, as input to the generative ML model. In some examples, the systems described herein may enable a user to iterate on the generated image before using an iteration of the generated image as a query to the image-based search algorithm. Additionally, in some examples, the systems described herein may generate paired images with relative captions to function as training data for generative ML models.

In some implementations, the techniques described herein relate to a method including: (i) receiving, by a processor, user input describing at least one parameter for a query image, (ii) generating, via a generative machine learning model executed by the processor, the query image based at least in part on the user input describing the at least one parameter for the query image, (iii) providing, by the processor, the query image as input to an image-based search algorithm, and (iv) returning a result received by the processor from the image-based search algorithm.

In some implementations, the techniques described herein relate to a method wherein receiving the user input comprises providing an image creation interface to a user and receiving, via the image creation interface, an image created by the user as the user input.

In some implementations, the techniques described herein relate to a method wherein the user input comprises a text description of the at least one parameter.

In some implementations, the techniques described herein relate to a method wherein generating, via the generative machine learning model executed by the processor, the query image comprises (i) generating, via the generative machine learning model executed by the processor, an initial iteration of the query image, (ii) receiving user input specifying a change to the initial iteration of the query image, and (iii) generating, via the generative machine learning model executed by the processor, a new iteration of the query image based at least in part on the initial iteration of the query image and the user input specifying the change.

In some implementations, the techniques described herein relate to a method wherein generating the initial iteration of the query image comprises transmitting the initial iteration of the query image to a client device for display to a user providing the user input.

In some implementations, the techniques described herein relate to a method wherein the user input specifying the change comprises a text description of the change.

In some implementations, the techniques described herein relate to a method wherein generating, via the generative machine learning model executed by the processor, the query image based at least in part on the user input describing the at least one parameter for the query image, comprises (i) providing the at least one parameter to a prompt generation module, (ii) receiving, from the prompt generation module, a prompt for the generative machine learning model that is based on the at least one parameter and comprises a predetermined structure, and (iii) providing the prompt to the generative machine learning model.

In some implementations, the techniques described herein relate to a non-transitory computer-readable storage medium for tangibly storing computer program instructions capable of being executed by a computer processor, the computer program instructions defining steps of: (i) receiving, by a processor, user input describing at least one parameter for a query image, (ii) generating, via a generative machine learning model executed by the processor, the query image based at least in part on the user input describing the at least one parameter for the query image, (iii) providing, by the processor, the query image as input to an image-based search algorithm, and (iv) returning a result received by the processor from the image-based search algorithm.

In some implementations, the techniques described herein relate to a non-transitory computer-readable storage medium wherein receiving the user input comprises providing an image creation interface to a user and receiving, via the image creation interface, an image created by the user as the user input.

In some implementations, the techniques described herein relate to a non-transitory computer-readable storage medium wherein the user input comprises a text description of the at least one parameter.

In some implementations, the techniques described herein relate to a non-transitory computer-readable storage medium wherein generating, via the generative machine learning model executed by the processor, the query image comprises (i) generating, via the generative machine learning model executed by the processor, an initial iteration of the query image, (ii) receiving user input specifying a change to the initial iteration of the query image, and (iii) generating, via the generative machine learning model executed by the processor, a new iteration of the query image based at least in part on the initial iteration of the query image and the user input specifying the change.

In some implementations, the techniques described herein relate to a non-transitory computer-readable storage medium wherein generating the initial iteration of the query image comprises transmitting the initial iteration of the query image to a client device for display to a user providing the user input.

In some implementations, the techniques described herein relate to a non-transitory computer-readable storage medium wherein the user input specifying the change comprises a text description of the change.

In some implementations, the techniques described herein relate to a non-transitory computer-readable storage medium wherein generating, via the generative machine learning model executed by the processor, the query image based at least in part on the user input describing the at least one parameter for the query image, comprises (i) providing the at least one parameter to a prompt generation module, (ii) receiving, from the prompt generation module, a prompt for the generative machine learning model that is based on the at least one parameter and comprises a predetermined structure, and (iii) providing the prompt to the generative machine learning model.

In some implementations, the techniques described herein relate to a device including: a processor; and a storage medium for tangibly storing thereon logic for execution by the processor, the logic including instructions for: (i) receiving, by the processor, user input describing at least one parameter for a query image, (ii) generating, via a generative machine learning model executed by the processor, the query image based at least in part on the user input describing the at least one parameter for the query image, (iii) providing, by the processor, the query image as input to an image-based search algorithm, and (iv) returning a result received by the processor from the image-based search algorithm.

In some implementations, the techniques described herein relate to a device wherein receiving the user input comprises providing an image creation interface to a user and receiving, via the image creation interface, an image created by the user as the user input.

In some implementations, the techniques described herein relate to a device wherein the user input comprises a text description of the at least one parameter.

In some implementations, the techniques described herein relate to a device wherein generating, via the generative machine learning model executed by the processor, the query image comprises (i) generating, via the generative machine learning model executed by the processor, an initial iteration of the query image, (ii) receiving user input specifying a change to the initial iteration of the query image, and (iii) generating, via the generative machine learning model executed by the processor, a new iteration of the query image based at least in part on the initial iteration of the query image and the user input specifying the change.

In some implementations, the techniques described herein relate to a device wherein generating the initial iteration of the query image comprises transmitting the initial iteration of the query image to a client device for display to a user providing the user input.

In some implementations, the techniques described herein relate to a device wherein the user input specifying the change comprises a text description of the change.

FIG. 1 is a block diagram illustrating a system for generating a queryable image from text according to some of the example embodiments.

The illustrated system includes a server 102. Server 102 receives, by a processor 106, user input 104 describing at least one parameter for a query image 108. Processor 106 may generate, via a generative ML model 110, query image 108 based at least in part on user input 104. Next, processor 106 may provide query image 108 as input to an image-based search algorithm 112 and may return a result 114 received from image-based search algorithm 112. Although illustrated here on a single server 102, any or all of the systems described herein may be hosted by one or more servers and/or cloud-based processing resources. Alternatively, any or all of the systems described herein may be hosted on a client device such as a personal computing device, mobile device, laptop, desktop, smartphone, smart device, etc. Further details of these components are described herein and in the following flow diagrams.

In the various implementations, server 102, processor 106, and generative ML model 110 can be implemented using various types of computing devices such as laptop/desktop devices, mobile devices, server computing devices, etc. Specific details of the components of such computer devices are provided in the description of FIG. 5 which are not repeated herein. In general, these devices can include a processor and a storage medium for tangibly storing thereon logic for execution by the processor. In some implementations, the logic can be stored on a non-transitory computer readable storage medium for tangibly storing computer program instructions. In some implementations, these instructions can implement some of all of the methods described in FIG. 2 and FIG. 3.

In some implementations, user input 104 can comprise text. For example, a user may enter text into a form field in a browser window or an application. In one example, user input 104 may be text captured via a speech-to-text function from speech of the user. Additionally, or alternatively, user input 104 can include an image. For example, the systems described herein may provide the user with an image creation app that enables the user to create a sketch or a doodle to provide as input. In one implementation, the systems described herein may provide a line drawing tool, shape drawing tools (e.g., circles, squares, etc.), a fill tool, and/or other image creation tools. In other examples, the user may provide a pre-existing image as user input 104. In some examples, the user may provide a pre-existing image and edit that image using image editing tools provided by the systems described herein, such as the tools described above, tools to adjust brightness, contrast, and/or color, tools that enable cutting, copying, and/or pasting of elements in the image, and/or an inpainting tool.

Query image 108 generally represents any digital image created by a generative ML model. In some examples, query image 108 may include several iterations of similar images. For example, the generative ML model may generate an initial iteration of query image 108, receive user input requesting changes to the image, and generate an additional iteration of query image 108.

Image-based search algorithm 112 can comprise any type of search algorithm that receives images as input. In some implementations, image-based search algorithm 112 may include an image-to-image comparison algorithm that receives images as input and outputs similar images as results. In one implementation, image-based search algorithm 112 may be hosted on an external server that is not server 102 and/or may be operated by a third party to the operator of server 102. In some implementations, processor 106 may interface with image-based search algorithm 112 via an application programming interface (API). In other implementations, image-based search algorithm 112 may be hosted on server 102. In some implementations, image-based search algorithm 112 may be part of a search engine with multiple search options including text-based and image-based options. Alternatively, image-based search algorithm 112 may be part of a search engine that only accepts images as input.

Result 114 can comprise any image or set of images returned by an image-based search algorithm. In some examples, result 114 may include non-image data such as image captions, image titles, image metadata and/or text descriptions of image metadata (e.g., type, file size, etc.), image authors, image rights and/or usage information, and the like.

FIG. 2 is a flow diagram illustrating a method for generating a queryable image from text according to some of the example embodiments.

In step 202, the method can include receiving, by a processor, user input describing at least one parameter for a query image.

In some implementations, the user input may include text. For example, the user may describe an image in natural language, such as, "I want a picture of a lightweight blue denim jacket in a feminine cut." In some implementations, the user may input formatted text. In one example, the user may specify values for certain predetermined characteristics. For example, if the search is for images of clothing items specifically, the user may fill out an "item type" field with "jacket," a "season" field with "summer," a "color" field with "blue," a "material" field with "denim," and so forth.

Additionally, or alternatively, the user input may include an image. For example, the systems described herein may provide the user with an image creation interface with various features (draw tool, fill tool, etc.) that enables user to create a sketch or a doodle that can inform the query image. In some implementations, the systems described herein may combine the image and text. For example, a user may draw a doodle of a vague shirt shape in black and white and then specify in text, "red shirt with abstract pattern in silver."

In step 204, the method can include generating, via a generative ML model executed by the processor, the query image based at least in part on the user input describing the at least one parameter for the query image.

In some implementations, the method may provide the user's input directly to the generative ML model. Additionally, or alternatively, the method may perform one or more prompt engineering step and/or prompt generation step. For example, the method may provide the user's input to a prompt generation module that transform the user's natural language input into a prompt for a generative ML model that includes a predetermined structure and/or predetermined keywords. In some implementations, the method may add negative clauses to the prompt to avoid potentially offensive output.

Example User Input: I want a green collared shirt with a subtle paisley print being worn by a man.

Example Prompt: Green collared shirt, man wearing collared formal shirt, green paisley shirt, paisley print shirt, fashion photography, realistic, natural lighting, torso-up portrait, -shirtless -naked -erotic.

In the above example, the prompt generation module may parse the user input into a series of comma-separated phrases that repeat the most important elements of the prompt and include predetermined key phrases and/or stored key phrases based on the context, such as "fashion photography" and "realistic" for any prompt and "torso-up portrait" for prompts involving upper body clothing. In addition, the method may add stored and/or context-dependent negative prompt elements such as "-naked." In some implementations, the prompt generation module may include a library of predetermined and/or context-based keywords and/or phrases. In one implementation, the prompt generation module may include a large language model (LLM) that has been trained to take natural language descriptions of images as input and produce generative ML prompts as output.

In some examples, the method may combine an image and text provided as user input and provide both as input to the generative ML model. In some examples, the method may generate text describing the relationship of the image to the text, such as, "use the attached image as a basis for positioning" or "use the attached image as a basis for color palette."

Example User Text Input: I want a red v-neck shirt with an asymmetrical abstract pattern in silver or gold.

Example User Image Input: A black-and-white doodle of a t-shirt with a v-neck and a squiggle on the right side of the shirtfront.

Example Prompt: Use the attached image as a basis for generating a picture with red t-shirt, v-neck t-shirt, asymmetric abstract pattern on t-shirt, gold accents, silver accents, fashion photography, realistic, natural lighting, torso-up portrait.

In some implementations, the method may embed extra constraints and/or parameters into the query. For example, if the image-based search algorithm expects input images in specific image sizes and/or aspect ratios, the method may constrain the generative ML model to generate only images in those image sizes and/or aspect ratios. Similarly, the method may constrain the generative ML model to output images below a certain file size, of a certain file type, and/or with certain other characteristics that lend the images to being provided as input to an image-based search algorithm. For example, if the method is configured to enable searches for items, the method may constrain the generative ML model to produce images with neutral backgrounds that are less likely to distract from the item being searched for.

Example Default Constraint String: neutral background, neutral grey background, -3:4 -resolution:medium -size: medium -png.

In some implementations, the method may display the image generated by the generative ML model to the user before providing the image to the image-based search algorithm. For example, if the method is hosted on a client device, the method may display the image on a screen of the client device. Alternatively, if the method is hosted on a server, the method may transmit the image to a client device for display to the user.

Figure 3:
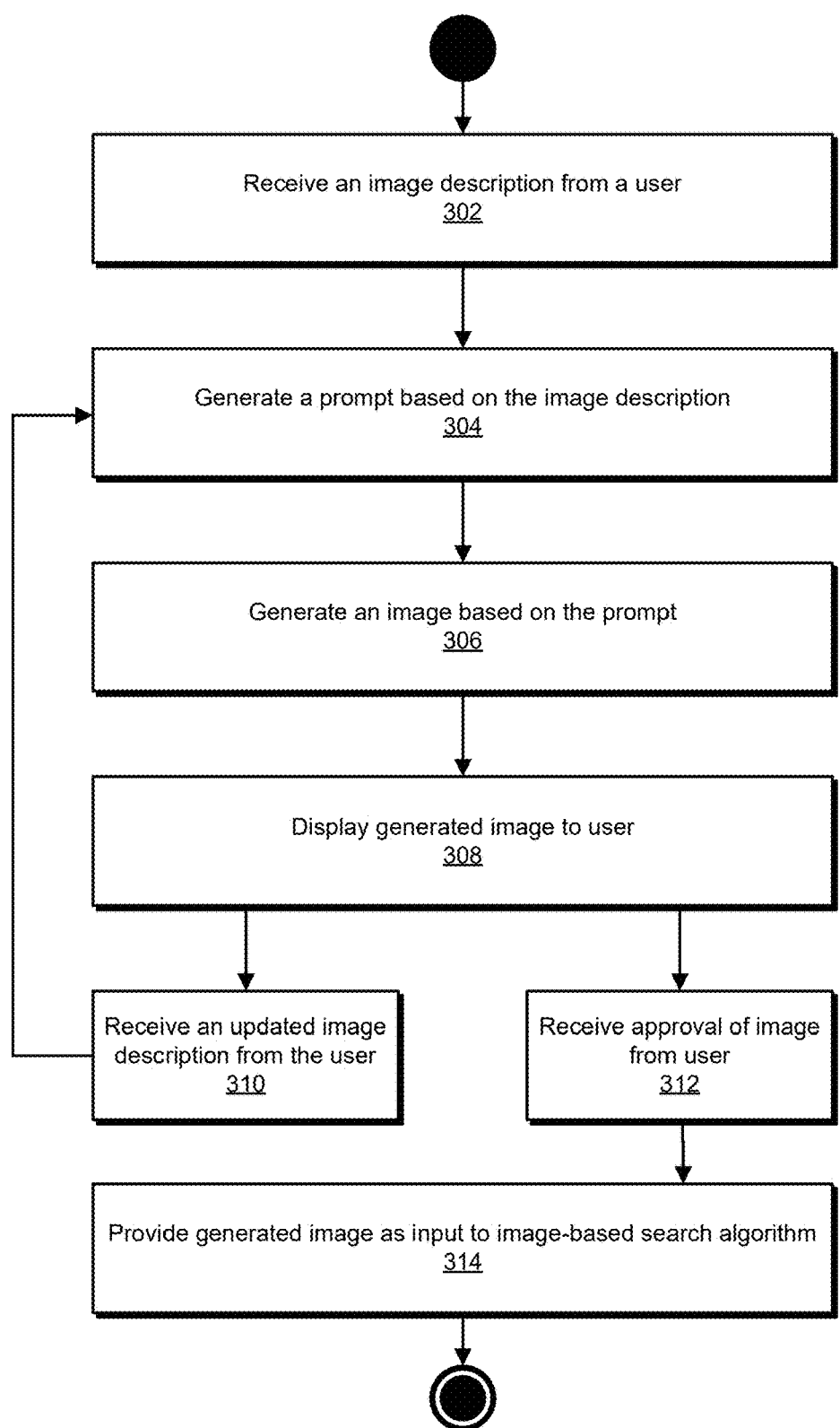
FIG. 3 is a flow diagram illustrating a method for a queryable image from text according to some of the example embodiments.

In some examples, after displaying and/or transmitting the image to the user, the method may receive input from the user suggesting changes to the image. For example, as illustrated in FIG. 3, at step 302, the method may receive an image description from a user. For example, the method may receive the image description, "red pleated skirt." At step 304, the method may generate a prompt based on the image description. For example, the method may generate the prompt, "red skirt, pleats, red pleated skirt, realistic, natural lighting, neutral background." At step 306, the method may generate an image based on the prompt. For example, the method may provide the prompt to the generative ML model and receive an image of a red pleated skirt on a neutral background generated by the model. At step 308, the method may display the generated image to the user.

At step 310, in some examples, the method may receive an updated image description from the user. For example, the user may specify, "make the skirt ankle-length." In this example, the method may return to step 304 and generate the prompt, "red skirt, pleats, ankle-length, ankle-length red pleated skirt, realistic, natural lighting, neutral background." The method may then generate a new image based on the updated prompt and display this image to the user at steps 306 and 308. The user may provide further updated feedback on the latest image, repeating the cycle any number of times. The below describes an example of several cycles of updated user input and updated prompts.

Example Initial User Input: I want blue denim capris.

Example Prompt: blue capris, denim capris, blue denim capri pants, ¾ length pants, realistic, fashion photography, neutral background.

Example Image: A photorealistic image of a pair of medium blue men's capris on a grey background.

Example Updated User Input: I want flattering women's capris, not baggy men's capris.

Example Updated Prompt: blue capris, denim capris, women's capris, fitted capri pants, slim capri pants, blue women's denim capri pants, ¾ length pants, realistic, fashion photography, neutral background.

Example Updated Image: A photorealistic image of a pair of slim light blue women's capris on a grey background.

Example Updated User Input: Make them dark blue, not light blue, and add pockets.

Example Updated Prompt: dark blue capris, navy denim capris, pockets, capri pants with pockets, women's capris, fitted capri pants, slim capri pants, navy blue women's denim capri pants, ¾ length pants, realistic, fashion photography, neutral background.

Example Updated Image: A photorealistic image of a pair of slim navy blue women's capris with pockets on a grey background.

In other examples, at step 312, the method may receive approval of the image from the user and proceed to step 314 and provide the generated image as input to the image-based search algorithm. In some implementations, the method may initiate an image-based search every time the method generates an image without requiring user approval. In one implementation, the method may enable a user to select a retrieved image to modify. For example, the method may provide an image of a pair of long blue jeans to the image-based search algorithm, receive and display three images of blue pants of varying lengths, and enable the user to select the image of a pair of blue denim capris among the search results to modify for the next iteration of the search rather than modifying the original generated image. Additionally, or alternatively, the method may generate additional images with different minor variations from the previous image and enable the user to select one of the generated images. For example, if the original image is a pair of black rain boots, the method may generate a pair of brown rain boots, a pair of black hiking boots, and/or a pair of black rain boots in a different style.

In some implementations, the method may enable the user to update the image directly via an image-editing tool. For example, the method may enable the user to change brightness, contrast, color settings, and the like, cut, copy, and/or paste elements of the image, paint over a portion of the image manually and/or with an inpainting model, relocate objects within the image (e.g., via automatically inpainting the object's original location and pasting and blending the object in the new location) and so forth.

Returning to FIG. 2, in step 206, the method can include providing, by the processor, the query image as input to an image-based search algorithm.

In some implementations, the method may provide the query image to an image-based search algorithm hosted on the same server or platform as the processor. Alternatively, the method may provide the query image to an external image-based search algorithm. In some implementations, the method may provide additional information to the image-based search algorithm. For example, the method may provide input specifying the number of results to return, the formatting of results, ordering of results, types of results to exclude (e.g., results labelled as mature), and so forth.

In step 208, the method can include returning a result received by the processor from the image-based search algorithm.

In some implementations, the method may receive a result from an image-based search algorithm and transmit the result to a client device for display to a user. In one implementation, the method may process the result. For example, the method may format a result for display within a user interface, convert embedded metadata to text (e.g., captions, image attribution, etc.), and/or perform other transformations. For example, if a user is searching a database of clothing items available for sale, the method may display item prices, style variations, etc., alongside the images of the items. In some examples, a result may be a single image with or without other associated data. In other examples, a result may include multiple images. In some examples, the image-based search algorithm may return a result indicating that no matching images were found and the method may convey this information to the user.

Example Result Image: A photo of a model wearing navy blue women's capris.

Example Result Text: Summer Collection Capris, $39, S-M-L-XL, available online and in-store.

Figure 4:
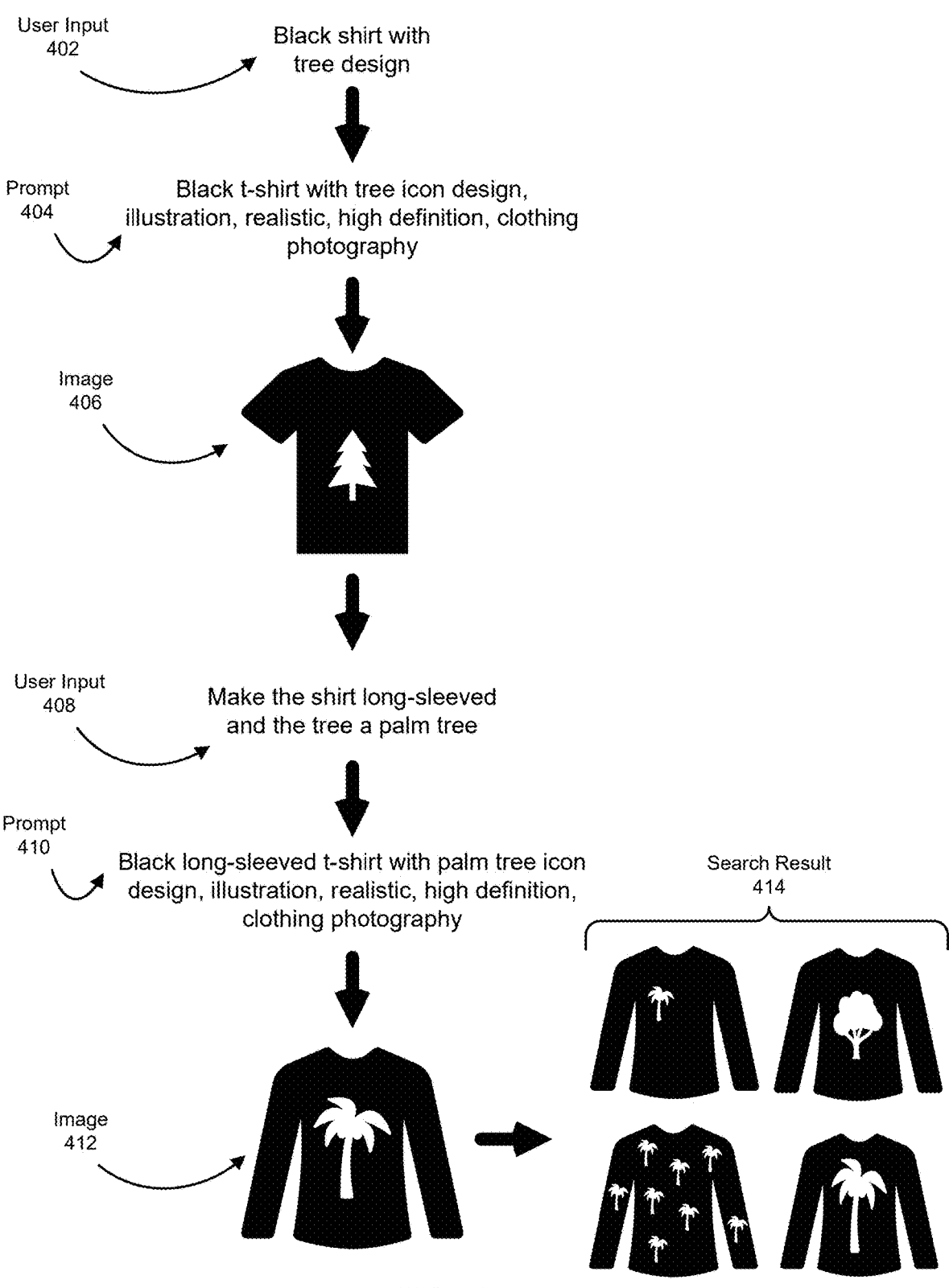
FIG. 4 is a flow diagram illustrating a method for a queryable image from text according to some of the example embodiments.

As described in greater detail above in connection with FIGS. 2 and 3, in some examples, the method may receive user input, transform the input into a prompt, produce an image based on the prompt, revise the image based on user feedback, and then return results based on searching with the revised image. For example, as illustrated in FIG. 4, the systems may receive user input 402, text that reads, "black shirt with tree design," transform that input into prompt 404, "black t-shirt with tree icon design, illustration, realistic, high definition, clothing photography," and provide prompt 404 as input to a generative ML model. In one example, the generative ML model may return image 406, an image of a black t-shirt with a pine tree design, which the method may display to the user.

In one example, the method may then receive user input 408 about image 406, "make the shirt long-sleeved and the tree a palm tree," and may modify prompt 404 based on user input 408 to create prompt 410, "black long-sleeved t-shirt with palm tree icon design, illustration, realistic, high definition, clothing photography." The method may provide prompt 410 to the generative ML algorithm and receive image 412, an image of a black t-shirt with a palm tree design. In one example, the user may approve image 412 (e.g., by clicking an "approve" or "search" button in the user interface) and the method may provide image 412 as input to an image-based search algorithm. In this example, the method may receive search result 414, a set of images of black long-sleeved shirts with tree designs, from the image-based search algorithm and may display and/or transmit search result 414 to the user.

In addition to producing query images for image-based search algorithms, in some implementations, the systems described herein may create images based on text and/or image input for other purposes. In one implementation, the systems described herein may use text input as a prompt to a generative ML model to produce pairs of images with relative captions that describe the differences between the images in text. For example, the systems described herein may create or receive an image of a red button-up shirt with silver buttons, create a text prompt that prompts the generative ML model to produce an image that is identical except the shirt has gold buttons, and then store the pair of images and the text prompt that describes the difference between the two images. In one example, the systems described herein may receive text input such as, "Generate a pair of image captions where the two captions in the pair are almost the same but differ in one aspect. The captions should refer to images whose main focus are fashion products."

Example First Image: A photorealistic image of a short-sleeved red button-up shirt with silver buttons on a white background.

Example Second Image: A photorealistic image of a short-sleeved red button-up shirt with gold buttons on a white background.

Example Text Prompt: Use the attached image as input. Recolor the silver buttons on the shirt to gold.

In one implementation, the systems described herein may automatically generate this data based on parameters for the data set. For example, the systems described herein may receive instructions such as "using this starting image of a shirt, generate image pairs and relative captions for different shirt colors, button colors, sleeve lengths, and fits." In one implementation, an LLM may process these instructions into a set of prompts for a generative ML model. In another example, the systems described herein may receive a database of images and a structured set of parameters for changes to apply to every image within the database. For example, the systems described herein may receive a database of images of clothing and a structured set of parameters describing colors and sizes of clothing items. In some examples, the systems described herein may use these pairs of images and relative captions for other functions, such as training data for further generative ML models.

The systems described herein may generate the data under various scenarios. For example, the systems described herein may begin with no data and use an LLM to generate captions for a pair of images and an image generation model to generate the corresponding images. In another example, the systems described herein may begin with an input image from which the system may generate text describing a modification and also generate the modified image according to the text. In another example, the systems described herein may begin with an input caption from which the system generates the first image as well as the text describing the modification and the modified image. In some implementations, the systems described herein may store images previously generated and modified by users, such as the images described in connection with method 300 above.

Figure 5:
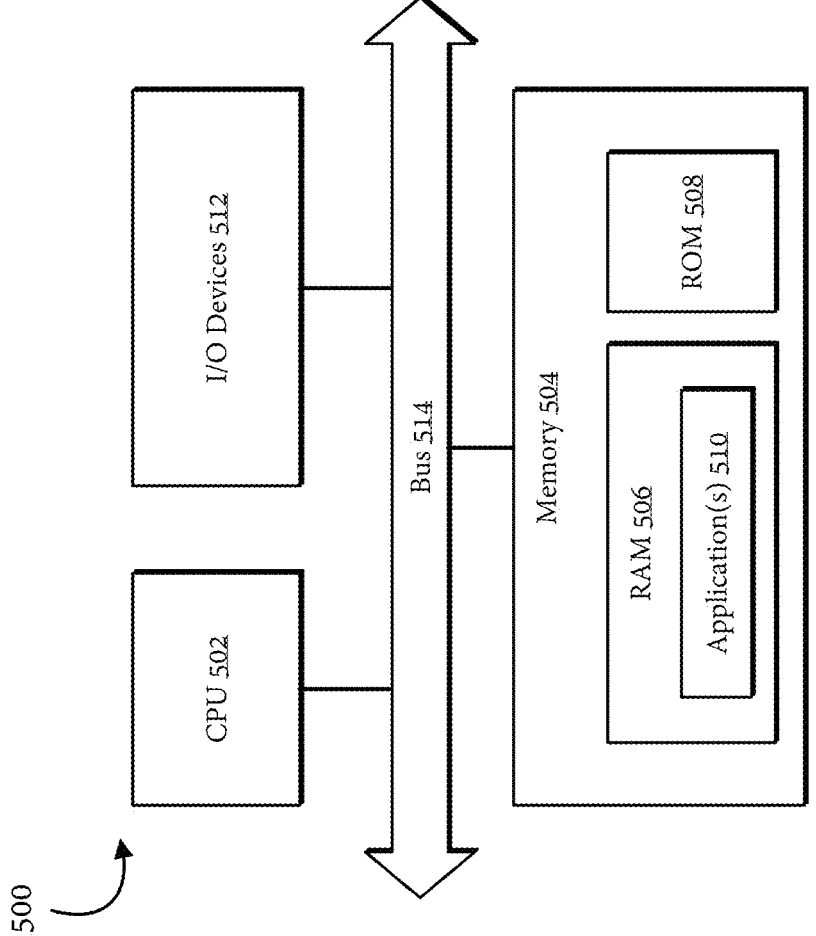
FIG. 5 is a block diagram of a computing device according to some embodiments of the disclosure.

FIG. 5 is a block diagram of a computing device according to some embodiments of the disclosure.

As illustrated, the device 500 includes a processor or central processing unit (CPU) such as CPU 502 in communication with a memory 504 via a bus 514. The device also includes one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 may comprise a general-purpose CPU. The CPU 502 may comprise a single-core or multiple-core CPU. The CPU 502 may comprise a system-on-a-chip (SoC) or a similar embedded system. In some embodiments, a graphics processing unit (GPU) may be used in place of, or in combination with, a CPU 502. Memory 504 may comprise a memory system including a dynamic random-access memory (DRAM), static random-access memory (SRAM), Flash (e.g., NAND Flash), or combinations thereof. In one embodiment, the bus 514 may comprise a Peripheral Component Interconnect Express (PCIe) bus. In some embodiments, the bus 514 may comprise multiple busses instead of a single bus.

Memory 504 illustrates an example of a non-transitory computer storage media for the storage of information such as computer-readable instructions, data structures, program modules, or other data. Memory 504 can store a basic input/output system (BIOS) in read-only memory (ROM), such as ROM 508 for controlling the low-level operation of the device. The memory can also store an operating system in random-access memory (RAM) for controlling the operation of the device.

Applications 510 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device may optionally communicate with a base station (not shown) or directly with another computing device. One or more network interfaces in peripheral devices 512 are sometimes referred to as a transceiver, transceiving device, or network interface card (NIC).

An audio interface in peripheral devices 512 produces and receives audio signals such as the sound of a human voice. For example, an audio interface may be coupled to a speaker and microphone (not shown) to enable telecommunication with others or generate an audio acknowledgment for some action. Displays in peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 may comprise any input device arranged to receive input from a user. An illuminator in peripheral devices 512 may provide a status indication or provide light. The device can also comprise an input/output interface in peripheral devices 512 for communication with external devices, using communication technologies, such as USB, infrared, Bluetooth®, or the like. A haptic interface in peripheral devices 512 provides tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 5, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the,"

again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

receiving, by a processor, user input describing at least one parameter for a query image;

generating, via a prompt generation module, a structured prompt by transforming the user input into a predetermined format that includes the at least one parameter and automatically generated context-dependent keywords not present in the user input, the context-dependent keywords selected from a library of predetermined keywords based on the at least one parameter to enhance image generation quality;

generating, via a generative machine learning model executed by the processor, an initial iteration of the query image based at least in part on the structured prompt;

transmitting the initial iteration of the query image to a client device for display to a user;

displaying the initial iteration of the query image via an interactive interface that enables direct visual modification of the initial iteration;

receiving user input specifying a change to the initial iteration of the query image;

in response to receiving the user input specifying the change, generating, via the generative machine learning model, a new iteration of the query image based on the direct visual modification and the user input specifying the change while maintaining unmodified aspects of the initial iteration;

providing, by the processor, a final iteration of the query image as input to an image-based search algorithm; and returning a result received by the processor from the image-based search algorithm.

2. The method of claim 1, wherein receiving the user input comprises: providing an image creation interface to a user; and receiving, via the image creation interface, an image created by the user as the user input.

3. The method of claim 1, wherein the user input comprises a text description of the at least one parameter.

4. The method of claim 1, wherein generating, via the generative machine learning model executed by the processor, the query image based at least in part on the user input describing the at least one parameter for the query image, comprises: providing the at least one parameter to a prompt generation module; receiving, from the prompt generation module, a prompt for the generative machine learning model that is based on the at least one parameter and comprises a predetermined structure; and providing the prompt to the generative machine learning model.

5. A non-transitory computer-readable storage medium for tangibly storing computer program instructions capable of being executed by a computer processor, the computer program instructions defining steps of:

receiving, by a processor, user input describing at least one parameter for a query image;

generating, via a prompt generation module, a structured prompt by transforming the user input into a predetermined format that includes the at least one parameter and automatically generated context-dependent keywords not present in the user input, the context-dependent keywords selected from a library of predetermined keywords based on the at least one parameter to enhance image generation quality;

generating, via a generative machine learning model executed by the processor, an initial iteration of the query image based at least in part on the structured prompt;

transmitting the initial iteration of the query image to a client device for display to a user;

displaying the initial iteration of the query image via an interactive interface that enables direct visual modification of the initial iteration;

receiving user input specifying a change to the initial iteration of the query image;

in response to receiving the user input specifying the change, generating, via the generative machine learning model, a new iteration of the query image based on the direct visual modification and the user input specifying the change while maintaining unmodified aspects of the initial iteration;

providing, by the processor, a final iteration of the query image as input to an image-based search algorithm; and returning a result received by the processor from the image-based search algorithm.

6. The non-transitory computer-readable storage medium of claim 5, wherein receiving the user input comprises: providing an image creation interface to a user; and receiving, via the image creation interface, an image created by the user as the user input.

7. The non-transitory computer-readable storage medium of claim 5, wherein the user input comprises a text description of the at least one parameter.

8. The non-transitory computer-readable storage medium of claim 5, wherein generating, via the generative machine learning model executed by the processor, the query image based at least in part on the user input describing the at least one parameter for the query image, comprises: providing the at least one parameter to a prompt generation module; receiving, from the prompt generation module, a prompt for the generative machine learning model that is based on the at least one parameter and comprises a predetermined structure; and providing the prompt to the generative machine learning model.

9. A device comprising: a processor; and a storage medium for tangibly storing thereon logic for execution by the processor, the logic comprising instructions for:

receiving, by a processor, user input describing at least one parameter for a query image;

generating, via a prompt generation module, a structured prompt by transforming the user input into a predetermined format that includes the at least one parameter and automatically generated context-dependent keywords not present in the user input, the context-dependent keywords selected from a library of predetermined keywords based on the at least one parameter to enhance image generation quality;

generating, via a generative machine learning model executed by the processor, an initial iteration of the query image based at least in part on the structured prompt;

transmitting the initial iteration of the query image to a client device for display to a user;

displaying the initial iteration of the query image via an interactive interface that enables direct visual modification of the initial iteration;

receiving user input specifying a change to the initial iteration of the query image;

in response to receiving the user input specifying the change, generating, via the generative machine learning model, a new iteration of the query image based on the direct visual modification and the user input specifying the change while maintaining unmodified aspects of the initial iteration;

providing, by the processor, a final iteration of the query image as input to an image-based search algorithm; and returning a result received by the processor from the image-based search algorithm.

10. The device of claim 9, wherein receiving the user input comprises: providing an image creation interface to a user; and receiving, via the image creation interface, an image created by the user as the user input.

11. The device of claim 9, wherein the user input comprises a text description of the at least one parameter.

12. The method of claim 1, wherein the structured prompt includes one or more negative clauses.

13. The method of claim 1, wherein generating the structured prompt comprises repeating key elements from the user input in multiple comma-separated phrases.

14. The method of claim 1, wherein the context-dependent keywords are selected from a library of predetermined keywords based on the at least one parameter.

15. The method of claim 1, wherein the prompt generation module comprises a large language model trained to transform natural language descriptions into generative model prompts.

16. The method of claim 1, wherein the interactive interface includes an inpainting tool for modifying portions of the initial iteration of the query image.

17. The method of claim 1, wherein the interactive interface includes tools for cutting, copying, and pasting elements of the initial iteration of the query image.

18. The method of claim 1, wherein the interactive interface includes tools for adjusting brightness, contrast, and color settings of the initial iteration.

19. The method of claim 1, further comprising embedding constraints in the structured prompt to control output image characteristics of the generative machine learning model.

20. The method of claim 1, wherein the user input comprises a combination of text input and an image created using an image creation interface provided to a user.

\* \* \* \* \*